Oct. 10, 1933.  J. W. BROWN  1,930,453
PROCESS OF MANUFACTURING GASOLINE
Filed April 1, 1929
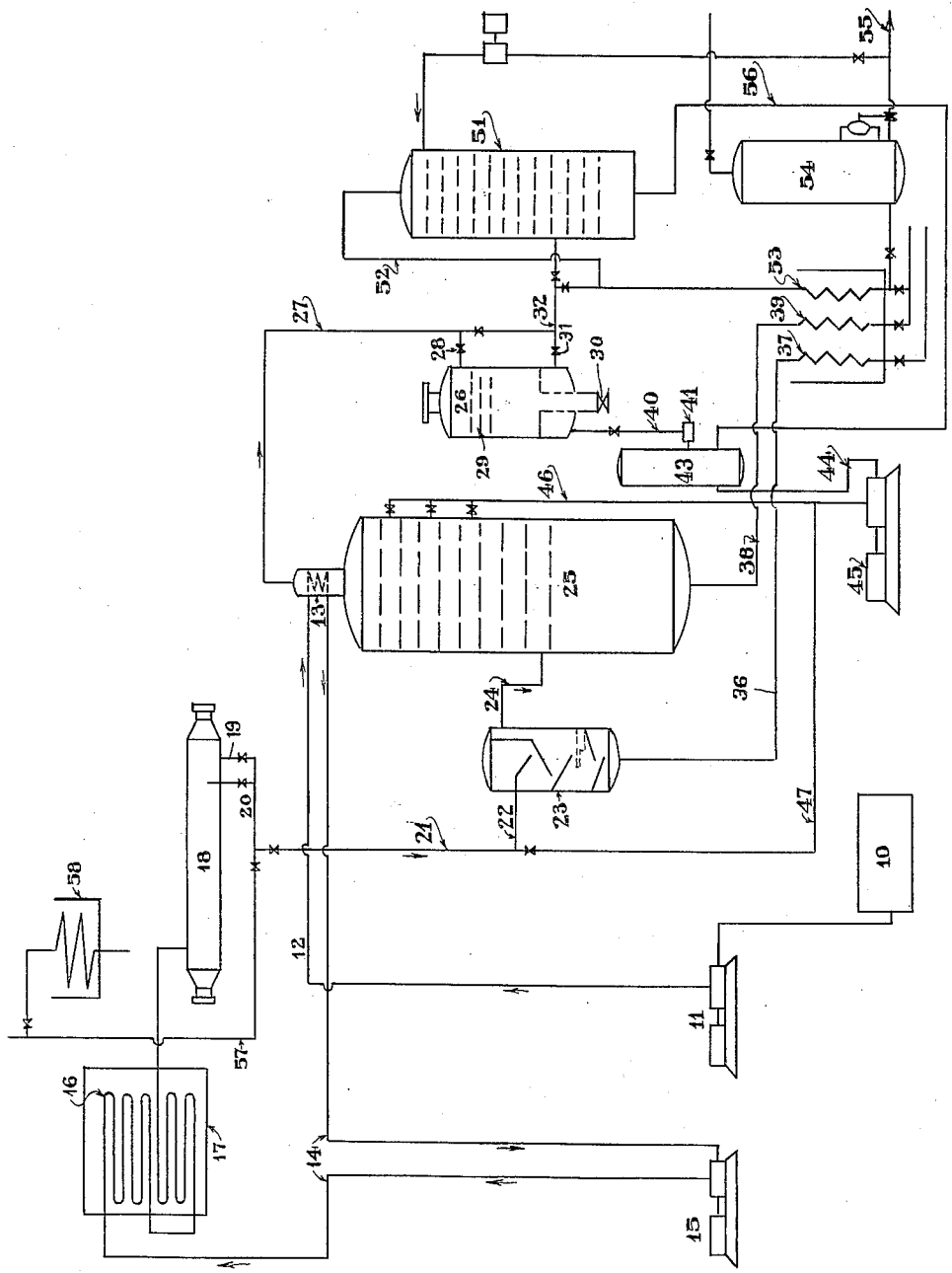
INVENTOR.
John W Brown
BY Wm O Bell
ATTORNEY.

Patented Oct. 10, 1933

1,930,453

UNITED STATES PATENT OFFICE 1,930,453

PROCESS OF MANUFACTURING GASOLINE

John W. Brown, Denver, Colo., assignor, by mesne assignments, to The Gray Processes Corporation, Newark, N. J., a corporation of Delaware Application April 1, 1929. Serial No. 351,587

5 Claims. (Cl. 196—96)

The present invention relates to the purification of hydrocarbons and has particular reference to the removal or conversion and removal of those impurities which are unstable in character and which tend, if left in a distillate such as gasoline, to form gummy or solid substances therein or which otherwise contaminate the hydrocarbon. Such impure hydrocarbons are produced by distillation processes and are characteristic by-products of cracking processes. The impurities which are found in the cracking process distillates have heretofore been recognized, and it is a practice to remove them by various means. Patent No. 1,624,692 patented to Henry Thomas, April 12, 1927, illustrates a process and apparatus for cracking and treating the cracked products to obtain a useful distillate. Cracking processes produce distillates which contain unstable or unsaturated compounds which it is desirable to remove from the hydrocarbon. These have the property of reacting, in time, or under accelerating conditions, with themselves or with other compounds, a process referred to as a condensation, or polymerization, to produce solid or gummy substances or substances of higher boiling properties. It has been a practice to treat vapors containing the unstable compounds to an agent such as Fuller's earth, or bauxite, or active carbon, to remove or reduce the impurities. The hydrocarbon may be treated to such materials in the vapor phase, keeping the agent sufficiently hot to prevent condensation of the bulk of the hydrocarbon in the agent, or keeping the agent at such a temperature that some condensation is permitted.

One object of the present invention is to treat the vapors that leave the purifying agent so as to separate high and low boiling constituents.

Another object is to return the high boiling compounds so separated to the material in process at some stage prior to its passage through the purifying agent, so that the undesired impurities may be removed from the process at one or more places as may be provided, and so that the valuable constituents that may be contained therein may be recovered by subsequent steps of the process.

Various other objects and advantages of the invention will appear from the following description of one manner of carrying out the invention. In giving this illustrative example, I have chosen to describe the invention as it may be reduced to practice in combination with a cracking process, and have shown apparatus suitable for both the cracking process and for the present invention. It is to be understood, however, that the invention is not limited to the example herein given or to the apparatus herein shown, and that the invention may be differently combined with other processes, or carried out as a complete process by itself, as expressed in the appended claims.

The accompanying drawing diagrammatically illustrates the apparatus employed in carrying out the invention. In the drawing the apparatus is shown as comprising an oil supply 10, which may contain gas oil, crude oil, or other hydrocarbon oil to be cracked. The oil is pumped by pump 11 through line 12 into reflux condenser coil 13 and line 14, and by means of pump 15 it is forced through heating coils 16 located in furnace 17. The oil may thus be heated to a temperature at which it may be cracked under heat and pressure as it passes through a reaction chamber 18. The gases which are formed by the cracking process aid in keeping the oil under high pressure, and the pressure which is maintained is sufficient to prevent vaporization of any substantial proportion of the hydrocarbon products. Any suitable cracking process may be employed, for example that described in Cross Patent No. 1,423,500. The hydrocarbon may be discharged from the reaction chamber through outlet 19 and line 20, thence through line 21 and inlet 22 into vaporizer 23. The high heat and pressure under which the material is maintained permits substantially complete vaporization on release into the vaporizer. In the vaporizer, any liquid or condensate may be drained to the bottom, and the vapors pass on through line 24 to a bubble tower. Here, the low boiling constituents may pass upwardly against condensate of higher boiling liquids, either formed in the bubble tower 25 by condensation of the entering vapors, or supplied to the tower from another source (as will be later described).

The tower is preferably maintained at such heat and pressure that subsequent operations on the vapor discharged therefrom may be carried on without the addition of heat from other sources, although this may be done. Such operations include the treatment of the vapors with a catalytic or cleansing agent, such as Fuller's earth, bauxite, clay, or active carbon, which may promote certain reactions of the unstable compounds in the vapors, and may remove impurities from the vapors, or change their character so that they may be subsequently removed. Such treatment is effected in a chamber 26 connected to the condenser by line 27 and inlet 28. The chamber contains a bed of cleansing agent 29 through which the vapor and condensate may pass. The bed is maintained at such a temperature that a substantial portion of the hydrocarbon passes through as vapor, and some condensation of the hydrocarbon may be permitted. The chamber is provided with a bottom opening 30 through which the cleansing agent may be removed by gravity. It also has an outlet for vapor alone, and an outlet for any condensate which may form. The vapor outlet 31 connects with pipe 32 so that the vapors may be subjected to further treatment in accordance with this invention. The condensate outlet 40 leads to a storage receptacle 43, from which, by means of pipe 44 and pump 45 the condensate may be returned to the system for further treatment. Since this liquid is derived from the vapors which enter the cleansing chamber it is likely to have a content of lighter boiling constituents that are useful. Consequently the material from receptacle 43 admixed with liquid in the process at some prior state, so that the lighter boiling content may be recovered. A line 46 is indicated through which such liquid may be introduced into the bubble tower for scrubbing by the rising vapors therein, and also a line 47 through which all or a portion of the liquid may be introduced into the vaporizer 23. The higher boiling constituents of this liquid and such other liquid as may form in the vaporizer falls to the bottom and is conducted by line 36 through a coil 37, and into a storage receptacle (not shown). Likewise, the liquid which drains to the bottom of the bubble tower 25 may be led through a line 38 and a coil 39 to a suitable storage receptacle.

The material which leaves the cleansing chamber or tower 26 as a vapor is then subjected to a fractional separation. This may be done by a fractional distillation or condensation, as in a bubble tower 51. Here the lighter fractions pass off as vapors through line 52 into a coil 53, wherein condensation takes place. The condensate then goes into a gas separator 54, and the liquid is conducted by line 55 to storage as the purified distillate of this invention. I have shown the line 52 optionally connected directly to the coil 53 with suitable valves, so that the bubble tower 51 may be cut out if necessary. The liquid residue from the bubble tower 51 flows through line 56 to a receptacle from which it may be returned to the material in the process prior to the cleansing step. For convenience, I connect the line 56 to the tank 43, and the liquid may be mixed with that liquid which is received from the cleansing chamber.

It will be noted that the drawing shows a line 57 from the line 20 to a condenser 58. By means of this arrangement the products of the reaction chamber 18 may be directly condensed to a liquid and placed in storage. Such liquid will contain unstable compounds which it is the aim of this invention to remove, and such liquid may subsequently be treated to form vapors which may be passed through a cleansing process such as that which takes place in chamber 26, and the material in the vapors therefrom fractionally separated into a distillate of purified character and into residues, which may, if desired, be scrubbed as herein described, or in other ways, to recover the lighter fractions of the residues.

From the foregoing it will be understood that vapors which pass from the cleansing process are subjected to a separation step, the preferred here described being a fractional distillation or condensation in tower 51. The tower discharges two fractions, the lighter boiling as vapors, and the heavier boiling as a liquid. The vapor comprises the purified hydrocarbon of the invention. The liquid may contain a considerable quantity of the desirable hydrocarbon but mixed with impurities. Consequently it is subjected to further purification, and in the present disclosure such purification is carried out by mixing the liquid with material in process prior to the cleansing step.

I claim:

1. The method of treating cracked hydrocarbon vapors to obtain a stable distillate including the steps of fractionating the vapors in a first fractionating stage, withdrawing the head product from said fractionating stage, clay-treating said head product, withdrawing the polymers formed in the clay-treating stage, fractionating the clay-treated vapors in a second fractionating stage, withdrawing the tail product from the second fractionating stage, mixing said tail product and said polymers and introducing said mixture at selected points in the first fractionating stage.

2. The method of treating cracked hydrocarbon vapors to obtain a stable distillate including the steps of fractionating the vapors in a first fractionating stage, withdrawing the head product from said fractionating stage, clay-treating said head product, withdrawing the polymers formed in the clay-treating stage, fractionating the clay-treated vapors in a second fractionating stage, withdrawing the tail product from the second fractionating stage, mixing said tail product and said polymers and recycling said mixture.

3. The method of treating cracked hydrocarbon vapors to obtain a stable distillate including the steps of fractionating the vapors in a first fractionating stage, withdrawing the head product from said fractionating stage, clay-treating said head product, withdrawing the polymers formed in the clay-treating stage, fractionating the clay-treated vapors in a second fractionating stage, withdrawing the tail product from the second fractionating stage, mixing said tail product and said polymers, introducing said mixture at selected points in the first fractionating stage, and simultaneously introducing a portion of said mixture to the cracked hydrocarbon vapors for recycling.

4. The method of treating cracked hydrocarbon vapors to obtain a stable distillate including the steps of fractionating the vapors in a first fractionating stage, withdrawing the head product from said fractionating stage, clay-treating said head product, withdrawing the polymers formed in the clay-treating stage, fractionating the clay-treated vapors in a second fractionating stage, withdrawing the tail product from the second fractionating stage, mixing said tail products and said polymers and introducing said mixture in said first fractionating stage.

5. The method of treating cracked hydrocarbon vapors to obtain a stable distillate including the steps of fractionating the vapors in a first fractionating stage, withdrawing the head product from said fractionating stage, clay-treating said head product, withdrawing the polymers formed in the clay-treating stage, fractionating the clay-treated vapors in a second fractionating stage, withdrawing the tail product from the second fractionating stage, mixing said tail product and said polymers, and returning said mixture to the stream of cracked hydrocarbon vapors prior to their entry into said first fractionating stage.

JOHN W. BROWN.